United States Patent
Killeen et al.

(10) Patent No.: US 6,845,968 B2
(45) Date of Patent: Jan. 25, 2005

(54) FLOW-SWITCHING MICRODEVICE

(75) Inventors: Kevin Killeen, Palo Alto, CA (US); Hongfeng Yin, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/785,336

(22) Filed: Feb. 23, 2004

(65) Prior Publication Data

US 2004/0164265 A1 Aug. 26, 2004

Related U.S. Application Data

(63) Continuation of application No. 09/908,292, filed on Jul. 17, 2001, now Pat. No. 6,702,256.

(51) Int. Cl.[7] .............................................. F16K 31/02
(52) U.S. Cl. ................... 251/304; 137/625.46
(58) Field of Search ................ 251/304, 318, 251/326; 137/625.46

(56) References Cited

U.S. PATENT DOCUMENTS

| | | | |
|---|---|---|---|
| 4,869,282 A | | 9/1989 | Sittler et al. |
| 4,988,626 A | * | 1/1991 | Ajot et al. ................ 436/148 |
| 5,251,670 A | * | 10/1993 | Bates et al. ............. 137/625.46 |
| 5,291,226 A | | 3/1994 | Schantz et al. |
| 5,305,015 A | | 4/1994 | Schantz et al. |
| 5,333,831 A | | 8/1994 | Barth et al. |
| 5,368,704 A | | 11/1994 | Madou et al. |
| 5,417,235 A | | 5/1995 | Wise et al. |
| 5,500,071 A | | 3/1996 | Kaltenbach et al. |
| 5,571,410 A | | 11/1996 | Swedberg et al. |
| 5,645,702 A | | 7/1997 | Witt et al. |
| 5,705,813 A | | 1/1998 | Apffel et al. |
| 5,725,017 A | | 3/1998 | Elsberry et al. |
| 5,771,902 A | | 6/1998 | Lee et al. |
| 5,819,749 A | | 10/1998 | Lee et al. |
| 5,927,325 A | | 7/1999 | Bensaoula et al. |
| 5,964,239 A | | 10/1999 | Loux et al. |
| 6,102,068 A | | 8/2000 | Higdon et al. |
| 6,550,497 B2 | | 4/2003 | Thiele et al. |
| 6,613,560 B1 | * | 9/2003 | Tso et al. ................ 435/287.2 |

* cited by examiner

*Primary Examiner*—Edward K. Look
*Assistant Examiner*—John K. Fristoe, Jr.

(57) ABSTRACT

A microdevice is provided for controlling fluid flow. The microdevice includes a substantially planar contact surface and a plurality of fluid-transporting features associated therewith. Also included is a substrate having a substantially planar contact surface and a fluid-transporting feature associated therewith. The contact surfaces are positioned in slidable and fluid-tight contact to allow for controllable formation of a plurality of different flow paths upon alignment of the substrate fluid-transporting feature with each cover plate fluid-transporting features in succession. Typically, at least one of the cover plate and substrate is comprised of a biofouling resistant polymer, and the flow paths are of different lengths. Optionally, a plurality of fluid-transporting features is associated with the substrate so that flow paths are formed as a result of a different alignment of the fluid-transporting features.

20 Claims, 12 Drawing Sheets

FLOW-SWITCHING MICRODEVICE

CROSS-REFERENCE TO RELATED APPLICATIONS

This application is a continuation of U.S. patent application Ser. No. 09/908,292, filed Jul. 17, 2001, now U.S. Pat. No. 6,702,256, the disclosure of which is incorporated by reference herein.

TECHNICAL FIELD

The present invention relates to fluid flow control in microdevices. More specifically, the invention relates to microdevices that employ a high-pressure-capable valve structure, the valve structure optionally achieving flow path switching through rotational or linear motion.

BACKGROUND

Microfluidic devices (microdevices) hold great promise for many applications, particularly in applications that employ rare or expensive fluids. Proteomics and genomics are two important areas in which microfluidic devices may be employed. For example, many of the best-selling drugs today either are proteins or act by targeting proteins. In addition, many molecular markers of disease, the basis of diagnostics, are peptidic or nucleotidic sequences. Thus, development effort to advance the diagnostics or pharmaceutical technologies has focused on the discovery of medically important proteins and the genes from which they derive. Thus, biomolecular identification is a particularly important aspect of proteomics and genomics.

Biomolecular identification often involves separation processes such as chromatography and mass spectrometry. For example, U.S. Pat. No. 5,705,813 to Apffel et al. describes an integrated planar liquid handling system for matrix-assisted laser-desorption ionization time-of-flight (MALDI-TOF) mass spectrometry. The patent discloses that a reservoir for receiving fluid substances may be interconnected by a microchannel to a MALDI ionization surface, wherein the microchannel comprises a separation region that may be used for chromatographic-type separations.

This approach represents an example of recent progress in microdevices that can be used, for example, as chemical analysis tools or clinical diagnostic tools. The small size of microdevices allows for the analysis of minute quantities of sample, which is an important advantage when the sample is expensive or difficult to obtain. See, e.g., U.S. Pat. No. 5,500,071 to Kaltenbach et al., U.S. Pat. No. 5,571,410 to Swedberg et al., and U.S. Pat. No. 5,645,702 to Witt et al. Sample preparation, separation and detection compartments have been proposed to be integrated on such devices. Because microfabricated devices have a relatively simple construction, they are in theory inexpensive to manufacture. Nevertheless, the production of such devices presents various challenges. For example, the flow characteristics of fluids in the small flow channels of a microfabricated device may differ from the flow characteristics of fluids in larger devices, as surface effects come to predominate and regions of bulk flow become proportionately smaller. Thus, means for producing a motive force that moves analytes and fluids may have to be incorporated into such microanalytical devices. This may involve forming motive force means such as electrodes, which may add to the cost of the microdevice.

Thus, flow control is an important aspect of microdevice technology. Since it is well known that the flow characteristics of fluids in the small flow channels of a microdevice differ greatly from flow characteristics of fluids in bulk, conventional wisdom dictates that valve structures that control flow of fluids in bulk are not easily adapted for use in microfluidic devices. Accordingly, a number of patents disclose various valve technologies employed in microdevices. U.S. Pat. No. 4,869,282 to Sittler et al., for example, discloses a micromachined valve that employs a control force to deflect a polyimide film diaphragm. Similarly, U.S. Pat. Nos. 5,771,902 and 5,819,794 to Lee et al. describe a microvalve that employs a controllable cantilever to direct blood flow. U.S. Pat. No. 5,417,235 to Wise et al describes an integrated microvalve structure with monolithic microflow controller that controls actuation electrostatically, and U.S. Pat. No. 5,368,704 to Madou et al. describes a micromachined valve that can be opened and closed electrochemically. Other aspects of valve operation and control are described in U.S. Pat. Nos. 5,333,831, 5,417,235, 5,725,017, 5,964,239, 5,927,325 and 6,102,068. Many of these valves are complex in construction and are incapable of the fast response times required in certain biomolecule analysis applications due to an excess of "dead space," i.e., unused and unnecessary space within the microdevice.

Thus, there is a need for an improved and simplified valve structure for controlling fluid flow in microdevices without introducing excessive dead space therein.

SUMMARY OF THE INVENTION

Accordingly, it is an object of the present invention to overcome the above-mentioned disadvantages of the prior art by providing a microdevice that allows for improved fluid flow control.

Additional objects, advantages and novel features of the invention will be set forth in part in the description that follows, and in part will become apparent to those skilled in the art upon examination of the following, or may be learned through routine experimentation upon practice of the invention.

The invention relates to a microdevice for controlling fluid flow. A cover plate is provided having a substantially planar contact surface and a plurality of fluid-transporting features associated therewith. Also provided is a substrate having a substantially planar contact surface and a fluid-transporting feature associated therewith. The contact surfaces are positioned in slidable and fluid-tight contact to allow for controllable formation of a plurality of different flow paths upon alignment of the substrate fluid-transporting feature with each cover plate fluid-transporting features in succession. Fluid flow control may be effected through mechanical actuation, typically, through a sliding and or rotation motion.

Often, the substrate is comprised of a biofouling resistant polymer such as polyimide, and the flow paths are of different lengths. In addition, the substrate may be associated with plurality of fluid-transporting feature, and each flow path may be formed as a result of a different alignment of the fluid-transporting features.

BRIEF DESCRIPTION OF THE DRAWINGS

FIG. 1A illustrates the device in exploded view. FIGS. 1B and 1C illustrate in cross-sectional view (along dotted line A of FIG. 1A) the switching structure of the microdevice in closed and open configurations, respectively.

FIG. 2A illustrates the microdevice in exploded view. FIGS. 2B and 2C illustrate in top and cross-sectional view, respectively, the switching structure of the microdevice in a closed configuration. FIGS. 2B and 2C illustrate in top and cross-sectional view, respectively, the switching structure of the microdevice in an open configuration.

FIG. 3A illustrates the microdevice in exploded view. FIG. 3B illustrates in schematic cross-sectional view the microdevice in a closed configuration. FIG. 3C illustrates in schematic cross-sectional view the microdevice in an open configuration.

FIG. 4A illustrates the microdevice in exploded view. FIG. 4B illustrates in top view the switching structure of the microdevice in a configuration that forms a first flow path. FIG. 4C illustrates in cross-sectional view the microdevice of FIG. 4B. FIG. 4D illustrates in top view the switching structure of the microdevice in a configuration that forms a second flow path. FIG. 4E illustrates in cross-sectional view the microdevice of FIG. 4D.

FIG. 5A illustrate the microdevice in exploded view. FIGS. 5B and 5C illustrate in cross-sectional view (along dotted line F) the valve structure in configurations having a first (longer) and second (shorter) flow path, respectively.

DETAILED DESCRIPTION OF THE INVENTION

Figure 1A:
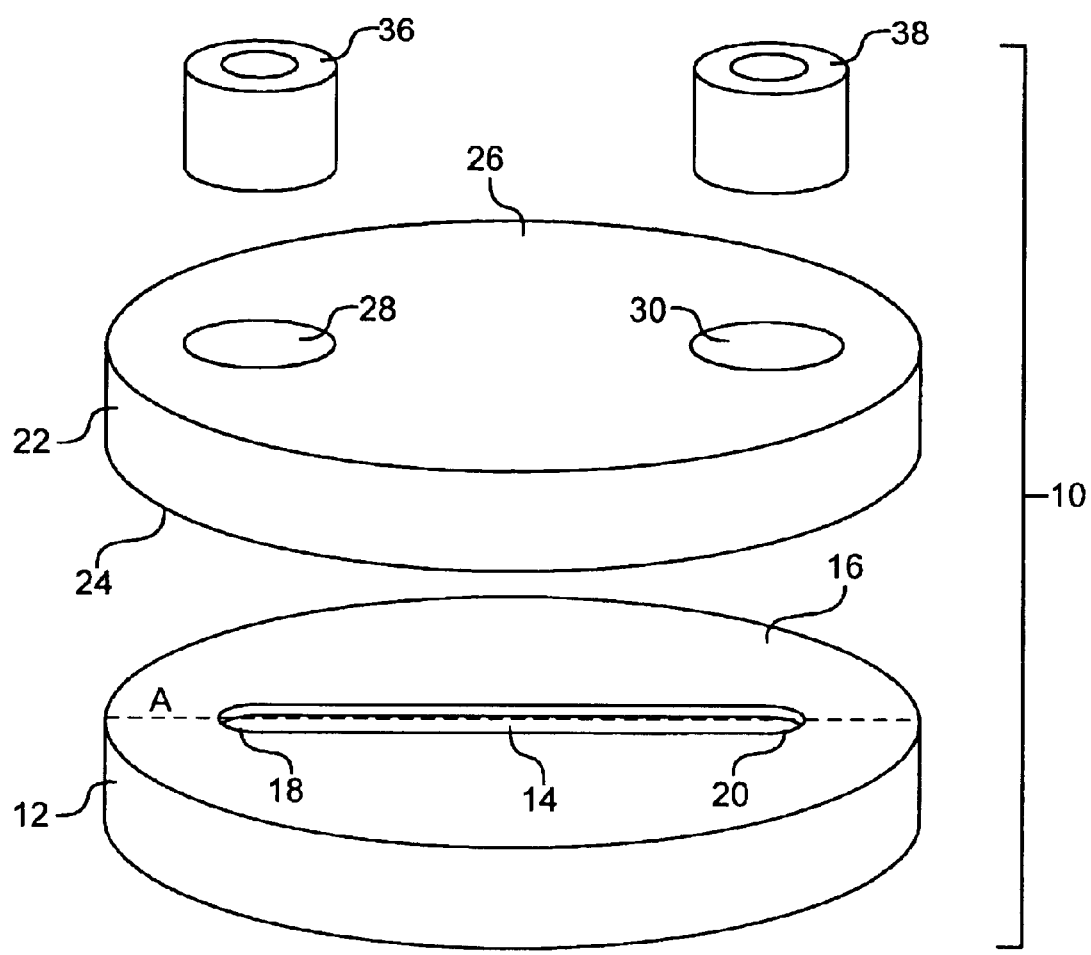
FIGS. 1A, 1B and 1C, collectively referred to as FIG. 1, schematically illustrate a prior art valve structure that employs a rotational motion to effect fluid communication between two conduits.

Before the invention is described in detail, it is to be understood that unless otherwise indicated this invention is not limited to particular materials, components or manufacturing processes, as such may vary. It is also to be understood that the terminology used herein is for purposes of describing particular embodiments only, and is not intended to be limiting.

It must be noted that, as used in the specification and the appended claims, the singular forms "a," "an" and "the" include plural referents unless the context clearly dictates otherwise. Thus, for example, reference to "a feature" includes a plurality of features, reference to "fluid" includes a mixture of fluids, and the like.

In this specification and in the claims that follow, reference will be made to a number of terms that shall be defined to have the following meanings, unless the context in which they are employed clearly indicates otherwise:

The term "controllable alignment" as used herein refers to the spatial relationship between two components of a microdevice, e.g., fluid-transporting features, wherein the spatial relationship may be adjusted according to a desired function of the micro device.

The term "flow path" as used herein refers to the route or course along which a fluid travels or moves. Flow paths are formed from one or more fluid-transporting features of a microdevice.

The term "fluid-transporting feature" as herein refers to an arrangement of solid bodies or portions thereof that direct fluid flow. As used herein, the term includes, but is not limited to, chambers, reservoirs, conduits and channels. The term "conduit" as used herein refers to a three-dimensional enclosure formed by one or more walls and having an inlet opening and an outlet opening through which fluid may be transported. The term "channel" is used herein to refer to an open groove or a trench in a surface. A channel in combination with a solid piece over the channel forms a conduit.

The term "fluid-tight" is used herein to describe the spatial relationship between two solid surfaces in physical contact such that fluid is prevented from flowing into the interface between the surfaces.

The term "embossing" is used to refer to a process for forming polymer, metal or ceramic shapes by bringing an embossing die into contact with a pre-existing blank of polymer, metal or ceramic. A controlled force is applied to the embossing die and such that the pattern and shape determined by the embossing die is pressed into the pre-existing blank of polymer, metal or ceramic. The term "embossing" encompasses "hot embossing," which is used to refer to a process for forming polymer, metal or ceramic shapes by bringing an embossing die into contact with a heated pre-existing blank of polymer, metal or ceramic. The pre-existing blank of material is heated such that it conforms to the embossing die as a controlled force is applied to the embossing die. The resulting polymer, metal or ceramic shape is cooled and then removed from the embossing die.

The term "injection molding" is used to refer to a process for molding plastic or nonplastic ceramic shapes by injecting a measured quantity of a molten plastic or ceramic substrate into a die (or mold). In one embodiment of the present invention, miniaturized devices can be produced using injection molding.

The term "in order" is used herein to refer to a sequence of events. When a fluid travels "in order" through an inlet port and a conduit, the fluid travels through the inlet port before traveling through the conduit. "In order" does not necessarily mean consecutively. For example, a fluid traveling in order through an inlet port and outlet port does not preclude the fluid from traveling through a conduit after traveling through the inlet port and before traveling through the outlet port.

The term "LIGA process" is used to refer to a process for fabricating microstructures having high aspect ratios and increased structural precision using synchrotron radiation lithography, galvanoforming, and plastic molding. In a LIGA process, radiation sensitive plastics are lithographically irradiated with high energy radiation using a synchrotron source to create desired microstructures (such as channels, ports, apertures, and microalignment means), thereby forming a primary template.

The term "microalignment means" is defined herein to refer to any means for ensuring the precise microalignment of microfabricated features in a microdevice. Microalignment means can be formed either by laser ablation or by other methods of fabricating shaped pieces well known in the art. Representative microalignment means that can be employed herein include a plurality of appropriately arranged protrusions in component parts, e.g., projections, depressions, grooves, ridges, guides, or the like.

The term "microdevice" refers to a device having features of micron or submicron dimensions, and which can be used in any number of chemical processes involving very small amounts of fluid. Such processes include, but are not limited to, electrophoresis (e.g., capillary electrophoresis or CE), chromatography (e.g., $\mu$LC), screening and diagnostics (using, e.g., hybridization or other binding means), and chemical and biochemical synthesis (e.g., DNA amplification as may be conducted using the polymerase chain reaction, or "PCR") and analysis (e.g., through peptidic digestion). The features of the microdevices are adapted to the particular use. For example, microdevices that are used in separation processes, e.g., CE, contain microchannels (termed "microconduits" herein when enclosed, i.e., when the cover plate is in place on the microchannel-containing substrate surface) on the order of 1 $\mu$m to 200 $\mu$m in diameter, typically 10 $\mu$m to 75 $\mu$m in diameter, and approximately 0.1 to 50 cm in length. Microdevices that are used in chemical and biochemical synthesis, e.g., DNA amplification, will generally contain reaction zones (termed "reaction chambers" herein when enclosed, i.e., again, when the cover plate is in place on the microchannel-containing substrate surface) having a volume of about 1 nl to about 100 $\mu$l, typically about 10 nl to 20 $\mu$l.

"Optional" or "optionally" as used herein means that the subsequently described feature or structure may or may not be present, or that the subsequently described event or circumstance may or may not occur, and that the description includes instances where a particular feature or structure is present and instances where the feature or structure is absent, or instances where the event or circumstance occurs and instances where it does not.

"Slidable contact" as used herein refers to the state or condition of touching between two solid members wherein the relative position of the members may be altered without physically separating the two members.

The invention thus provides a microdevice for controlling fluid flow. The microdevice comprises a substrate and a cover plate, each having a substantially planar contact surface and each contact surface having a fluid-transporting feature associated therewith. The substrate contact surface is positioned in slidable and fluid-tight contact with the cover plate contact surface to allow for controllable alignment between the fluid-transporting features. This valve structure provides previously unknown advantages in microdevice flow control by reducing "dead" sample volume, an advantage when samples are rare, expensive, or difficult to obtain.

To illustrate the advantages of the inventive device, an example of a prior art device is provided to illustrate the disadvantages associated therewith. FIG. 1 schematically illustrates a known valve structure for controlling bulk fluid flow in devices that are not constrained by the limitations associated with microfluidics. As with all figures referenced herein, in which like parts are referenced by like numerals, FIG. 1 is not necessarily to scale, and certain dimensions may be exaggerated for clarity of presentation. As shown in FIG. 1, the valve structure 10 is constructed from a cylindrical substrate 12 having a channel 14 in a substantially planar and circular substrate contact surface 16, the channel 14 having two termini, indicated at 18 and 20. The channel extends along a diameter of the substrate contact surface (indicated at A), and the midpoint of channel 14 coincides with the center point of the substrate contact surface.

Figure 1B:
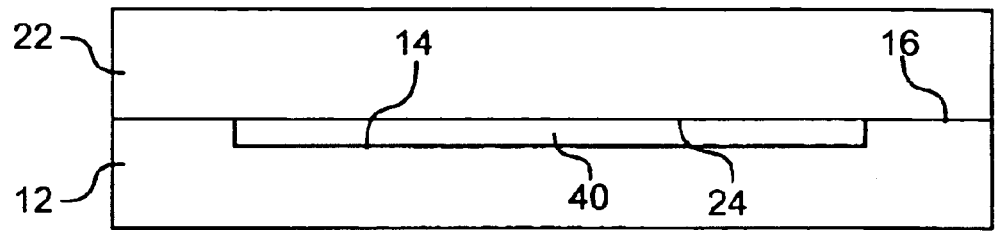
Figure 1C:
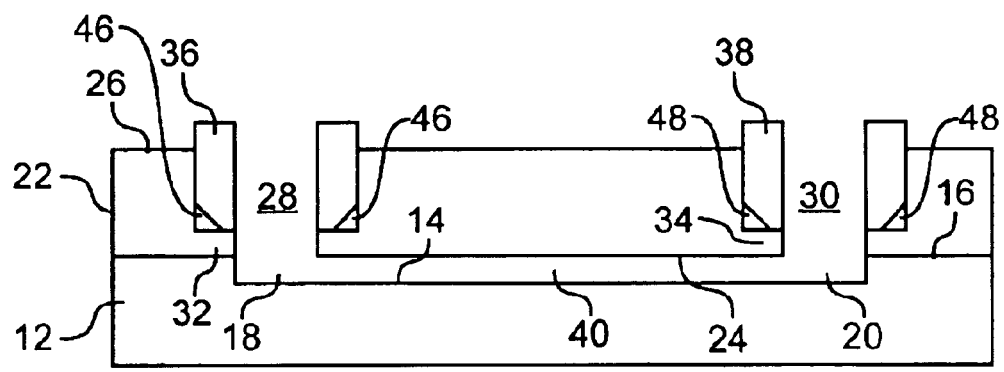

The valve structure 10 also includes a cylindrical cover plate 22 having substantially planar and circular contact surface 24 and a parallel opposing surface 26. As shown, the contact surfaces 16 and 24 are congruent. Two cylindrical conduits, indicated at 28 and 30, each extend through the cover plate in a direction orthogonal to the cover plate contact surface to provide communication between the opposing surfaces. The conduits lie along a diameter of the circular surface, and the distance between the conduits is the distance between the termini of channel on substrate contact surface. As shown in FIG. 1C, lips 32 and 34 protrude toward the central axis of cylindrical conduits 28 and 30, respectively, adjacent the contact surface. Tubes 36 and 38 are inserted into conduits 28 and 30, respectively. As shown, lips 32 and 34 serve to prevent tubes 36 and 38 from extending past the cover plate contact surface 24.

In operation, the cover plate contact surface 24 is positioned in slidable and fluid-tight contact with the substrate contact surface 16. As a result, the cover plate contact surface 24 in combination with channel 14 in the substrate contact surface 16 forms a conduit 40. As shown in FIG. 1B, when the cover plate conduits 28 and 30 are not aligned with the substrate channel, the conduit 40 formed from channel 14 and the cover plate contact surface 24 is completely closed. However, when the cover plate is axially rotated with respect to the substrate, as shown in FIG. 1C, conduits 28 and 30 are aligned with termini 18 and 20 respectively. As a result, conduit 40 provides fluid communication between the cover plate conduits 28 and 30. Tubes 36 and 38 are provided fluid communication as well. In other words, rotational motion may open or close the valve structure 10. Once fluid communication is provided, a fluid flow path is created that travels in order though tube 36, cover plate conduit 28, substrate conduit 40, cover plate conduit 30 and tube 38. It should be noted that because tubes 36 and 38 do not extend past cover plate contact surface 24, the tubes cannot hinder rotational motion between the cover plate and substrate nor can the tubes damage the contact surfaces of the substrate and/or the cover plate. Damage to the contact surfaces may result in compromise the capability of the contact surfaces to contact each other in a slidable and/or fluid-tight manner.

Because the above-described structure is ordinarily employed to control bulk fluid flow, it has not been previously adapted for use in microdevices. In addition, there are a number of disadvantages in employing the above-described valve to control fluid flow in microdevices, the primary disadvantage being the creation of "dead space." By "dead space" is meant a volume within a microdevice that can be eliminated without substantial detriment to performance of the microdevice. That is, to compensate for dead space within a microdevice, additional fluid is needed. For example, as shown in FIG. 1C, due to the presence of lips 32 and 34 within cover plate conduits 28 and 30 respectively, dead space, indicated at 42 and 44 is necessarily created. Dead space 42 and 44 is a mere artifact of the presence of lips 32 and 34 to prevent tubes 36 and 38 from contacting the substrate contact surface. In addition, tubes 36 and 38 rarely, if ever, fit perfectly within cover plate conduits 28 and 30, respectively. That is, the exterior surface of tubes do not always lie flush with the interior surface of the conduits. Thus, additional dead space indicated at 46 and 48 may result. This type of dead space is particularly detrimental to the performance of microdevices because, in addition to promoting sample waste, the dead space represents a source of contamination. If more than one fluid is conveyed through the microdevice, dead space 46 and 48 may retain the first fluid. If not removed before the second fluid is conveyed through the microdevice, the retained residue may contaminate the second fluid. It should be evident that because the dead space does not lie within an active portion of the fluid flow path, it would be difficult to remove residue from the dead space by flushing a cleaning fluid through the flow path. Complete removal of the first fluid residual may require extended flushing time and possibly a large quantity of cleaning fluid. Thus, this valve structure is not ideal for use with microfluidic devices, and it is not surprising that the valve structure has not been adapted for microfluidic applications.

Incorporation of valve structures for microdevices as now provided avoids creation of excessive dead space. One embodiment of the inventive microdevice, then, is constructed from a substrate and a cover plate, each having a substantially planar contact surface. A fluid-transporting feature is associated with each contact surface. The substrate contact surface is positioned in slidable and fluid-tight contact with the cover plate contact surface to allow for controllable alignment between the fluid-transporting features. As a result, fluid communication is achieved between the fluid-transporting features, typically through a small area to reduce dead volume. In addition, the formed microdevice contains flow paths defined by the fluid-transporting features. Preferably, the cross-sectional area of the flow paths is substantially constant to further reduce dead volume.

FIG. 2 illustrates a simple embodiment of the inventive microdevice that does not result in formation of excessive dead space. The microdevice 50 employs a switching structure that employs rotational motion to effect flow path switching. The microdevice 50 includes square substrate 52, with first and second substantially planar opposing surfaces indicated at 54 and 56, respectively, and comprised of a material that is substantially inert with respect to fluids that will be transported through the microdevice. The substrate 52 has a fluid-transporting feature in the form of a sample microchannel 58 in the first planar surface 54. The fluid-transporting feature may be formed through laser ablation or other techniques discussed below or known in the art. It will be readily appreciated that although the sample microchannel 58 has been represented in a generally extended form, sample microchannels for this and other embodiments can have a variety of configurations, such as in a straight, serpentine, spiral, or any tortuous path desired. Further, as described above, the sample microchannel 58 can be formed in a wide variety of channel geometries including semicircular, rectangular, rhomboid, and the like, and the channels can be formed in a wide range of aspect ratios. It is also noted that a device having a plurality of sample microchannels thereon falls within the spirit of the invention. The sample microchannel 58 has a sample inlet terminus 60 at one end and a sample outlet terminus 62 at another end. Protruding from the contact surface are microalignment means in the form of a plurality of guides 64 each located on a circle, indicated at B, whose diameter is only slightly shorter than the length of a side of the square substrate. The sample inlet terminus 60 is located within circle B at a point offset from its center and the sample outlet terminus is on the edge of the substrate. The guides serve to assist in the proper alignment of the cover plate with the substrate.

Like the substrate, a circular cover plate 70 is provided generally comprising first and second substantially planar opposing surfaces indicated at 72 and 74, respectively. The contact surface 72 of the cover plate 70 is capable of interfacing closely with the contact surface 54 of the substrate 52 to achieve fluid-tight contact between the surfaces. The cover plate 70 is arranged over the substrate contact surface 74, and the cover plate contact surface 72 in combination with the sample microchannel 58 defines a sample conduit 76 for conveying the sample. Because the contact surfaces of the cover plate and the substrate are in fluid-tight contact, the sample conduit 76 is fluid tight as well. The cover plate 70 can be formed from any suitable material for forming the substrate 52 as described below. Further, the cover plate 70 can be aligned over the substrate contact surface 54 by the guides 64 protruding therefrom. To ensure that the sample conduit is fluid-tight, pressure sealing techniques may be employed, e.g., by using external means to urge the pieces together (such as clips, tension springs or associated clamping apparatus). However, excessive pressure that precludes the substrate and cover plate contact surface from slidable contact should be avoided. The optimal pressure can be determined through routine experimentation. However, as with all embodiments described herein the pressure sealing techniques may allow the contacts surfaces to remain in fluid-tight contact under an internal microdevice fluid pressure of up to about 100 megapascals, typically about 0.5 to about 40 megapascals.

Figure 2A:
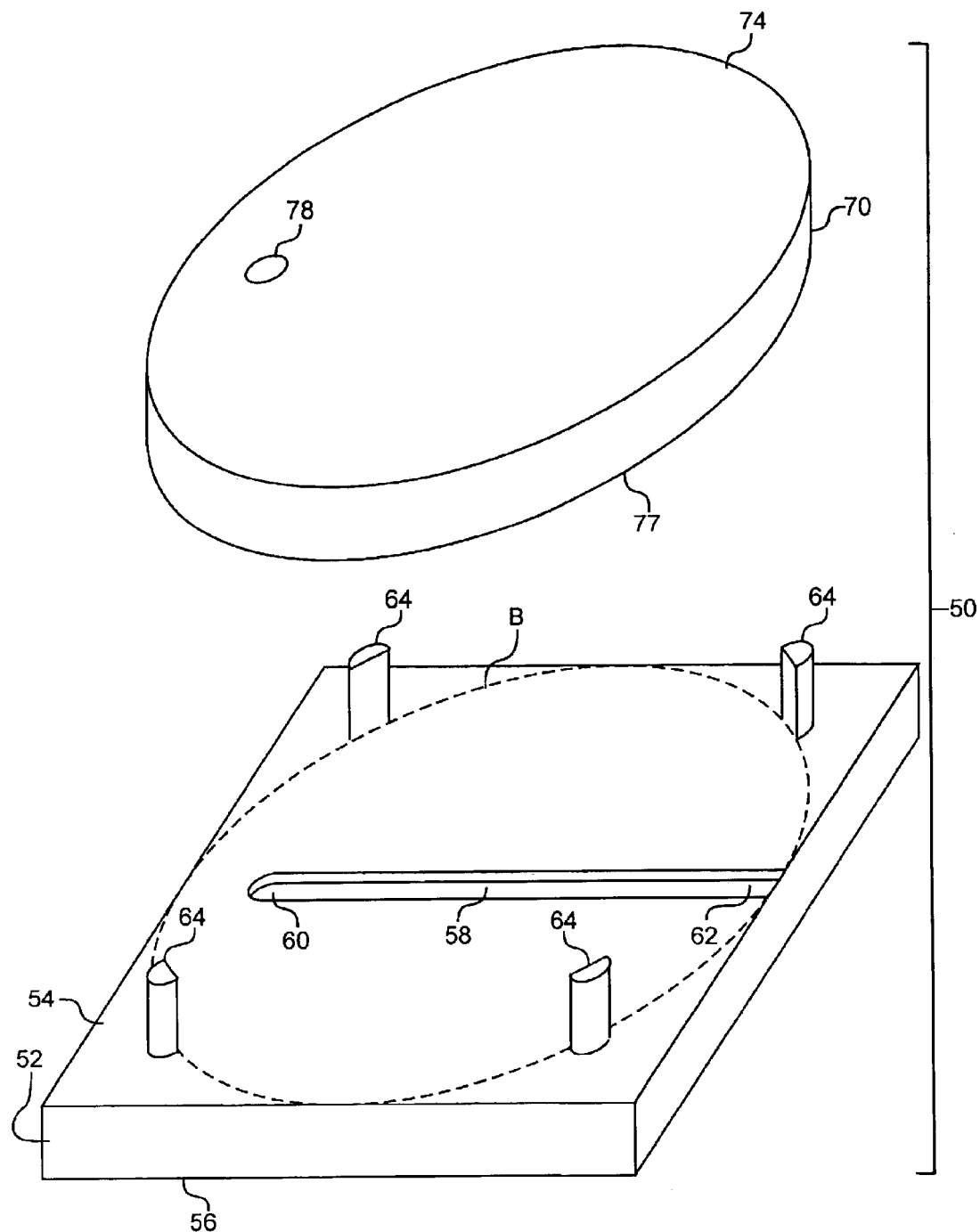
FIGS. 2A, 2B, 2C, 2D and 2E, collectively referred to as FIG. 2, schematically illustrate a microdevice having a valve structure of the invention that employs rotational motion to effect fluid flow switching.
Figure 2B:
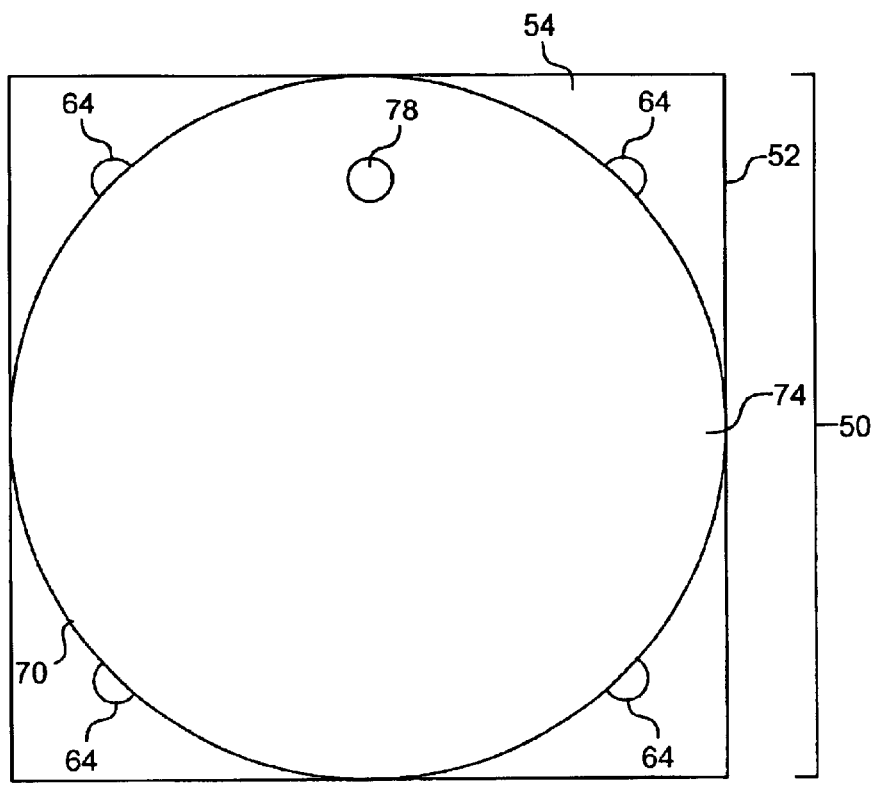
Figure 2C:
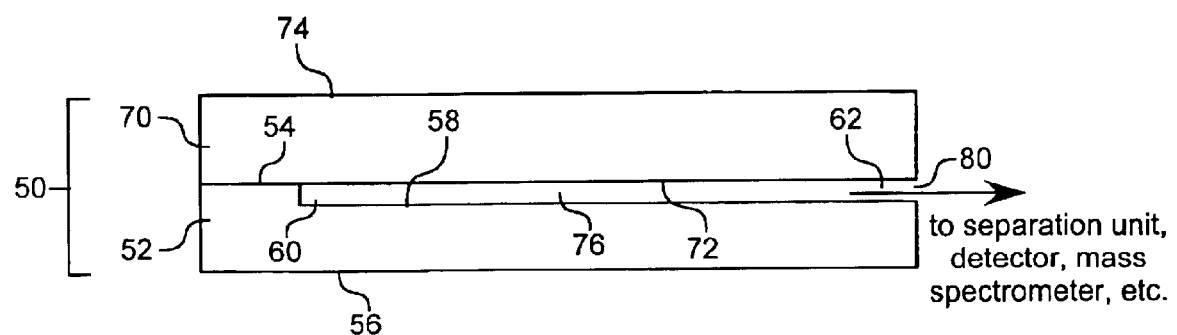
Figure 2D:
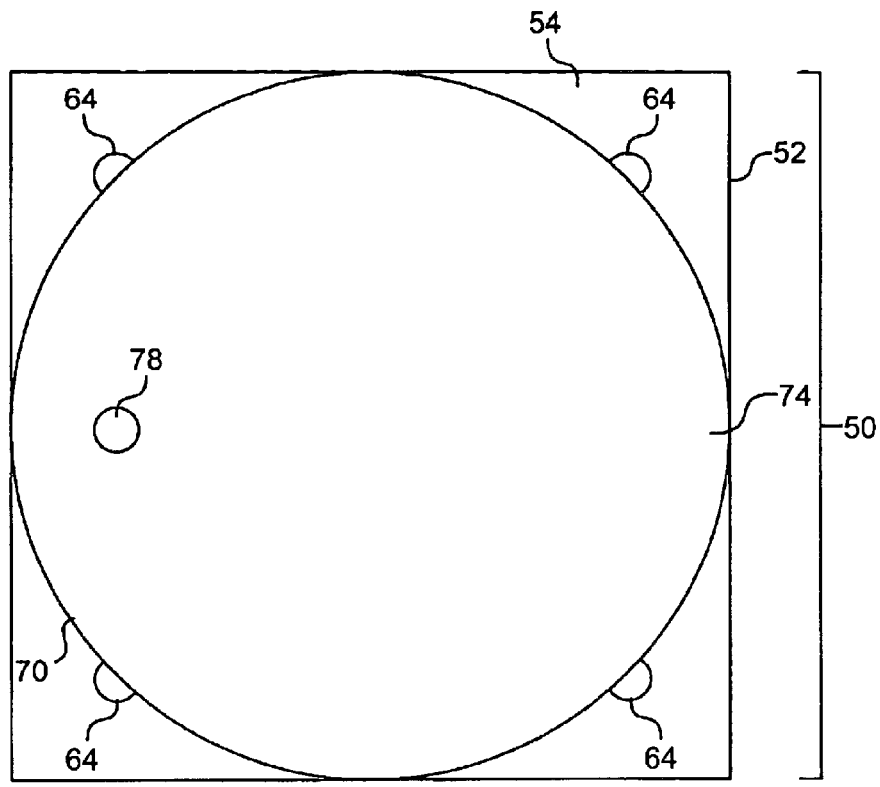
Figure 2E:
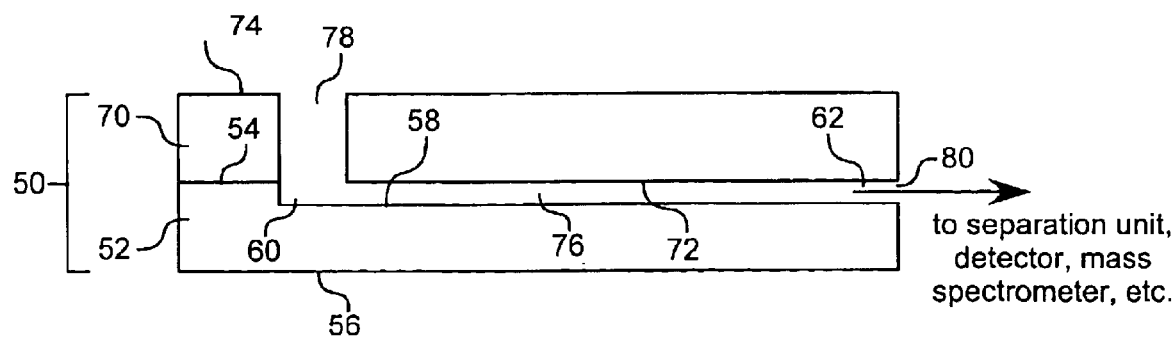

The cover plate 70 may also includes a variety of features. As shown, a sample inlet port 78 is provided as a cylindrical conduit extending through the cover plate in a direction orthogonal to the cover plate contact surface 72 to provide communication between surfaces 72 and 74. Although axial symmetry and orthogonality are preferred, the sample inlet port does not have to be axially symmetrical or extend in an orthogonal direction to the cover plate contact surface. The inlet port 78 can be arranged to communicate with the sample inlet terminus 60 of the sample microchannel 58. As shown, the inlet port 78 has a substantially constant cross-sectional area along its length. The sample inlet port 78 enables flow of the passage of fluid from an external source (not shown) into the sample microchannel. The cross sectional area of the inlet port should correspond to the width of the substrate microchannel and the shape of the microchannel at the inlet terminus. FIGS. 2B and 2C, for example, illustrate in top and cross-sectional view, respectively, the switching structure of the microdevice in a closed configuration. As shown, the sample inlet port is rotationally offset from the inlet terminus of the substrate microchannel. Thus, the inlet port 78 as shown is disengaged from the sample conduit 76. By rotating the cover plate with respect to the substrate to align the sample inlet port with the inlet terminus of the substrate microchannnel, as shown in FIGS. 2D and 2E, fluid communication is provided therebetween. As a result, the switching structure of the microdevice is switched to an open configuration. That is, a flow path is created from the sample inlet port 78 to the sample conduit 76. In operation, this sample fluid is introduced into sample inlet. When the microdevice is in an open configuration as shown in FIGS. 2D and 2E, the sample fluid is conveyed, in order, through the sample inlet port 78, sample conduit 76, and sample outlet port 79.

Figure 3A:
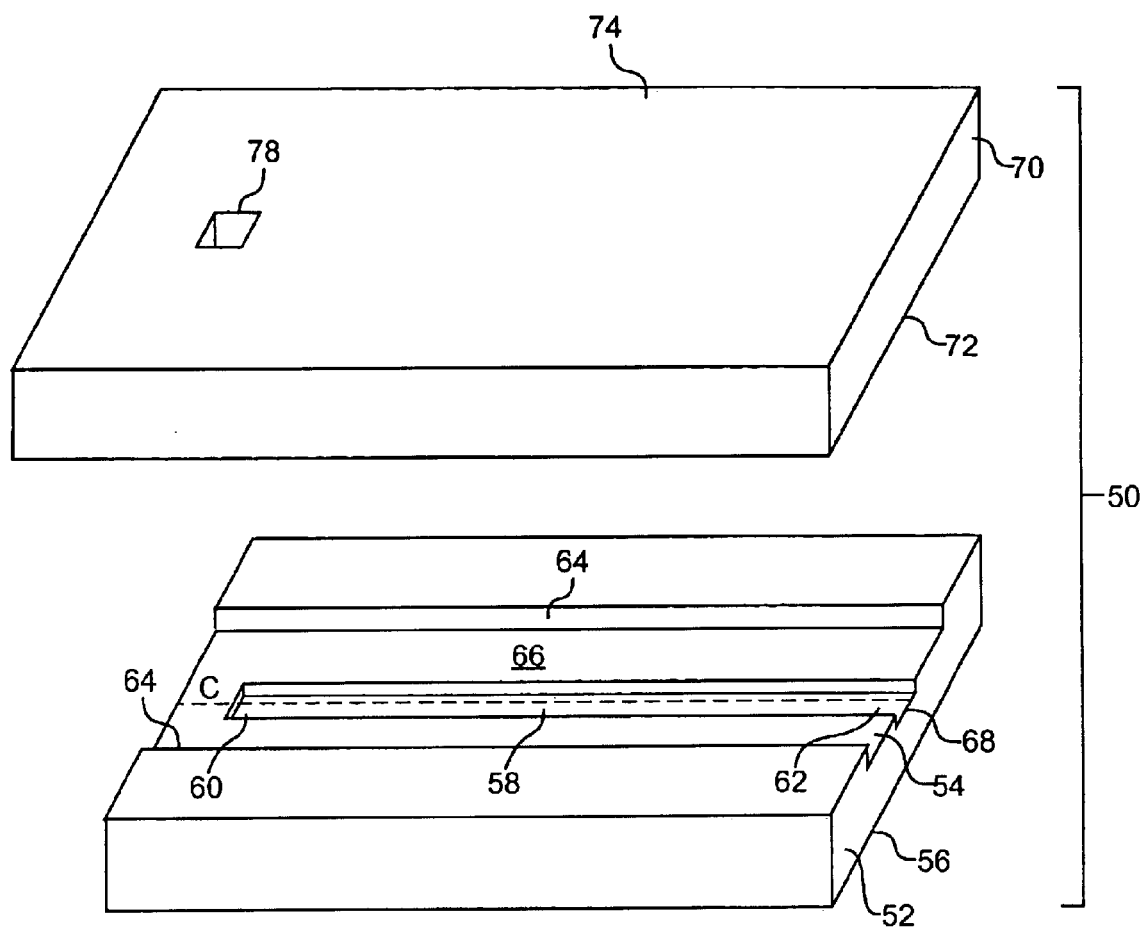
FIGS. 3A, 3B and 3C, collectively referred to as FIG. 3, schematically illustrate an embodiment of the microdevice that employs linear motion to effect fluid flow switching.

FIG. 3 schematically illustrates another embodiment of the inventive microdevice wherein linear motion is employed to effect fluid flow switching. The microdevice 50 includes a substrate 52 having first and second substantially planar opposing surfaces indicated at 54 and 56 respectively. Again, the substrate is comprised of a material that is substantially inert with respect to fluids that will be transported through the microdevice. The substrate 52 has a fluid-transporting feature in the form of a sample microchannel 58 in the first planar surface 54. The sample microchannel 58 has a sample inlet terminus 60 at one end and a sample outlet terminus 62 at another end. Protruding from the contact surface 54 are microalignment means in the form of projections 64 that serve to assist in the proper alignment of the cover plate with the substrate. Together with the contact surface, the projections 64 form a trough 66 having parallel, planar and vertical sidewalls. The sample inlet terminus 60 is located at a point in the trough 66 equidistant to the sidewalls. The sample microchannel extends along the length of the trough and terminates at sample outlet terminus 62 located at an edge 68 of the substrate 52.

Like the substrate, a rectangular cover plate 70 is provided generally comprising first and second substantially planar opposing surfaces indicated at 72 and 74, respectively. As illustrated in FIG. 3, the width of the cover plate is the same as the width of the substrate trough but the length of the cover plate differs from the length of the trough. The contact surface 72 of the cover plate 70 is capable of interfacing closely with the contact surface 54 of the substrate 52 to result in fluid-tight contact. The cover plate 70 is placed within the trough and thus arranged over the substrate contact surface 74, the cover plate 70 aligned by the projections 64 that form the side walls of the trough. The cover plate contact surface 72 in combination with the sample microchannel 58 defines a sample conduit 76 for conveying the sample. Because the contact surfaces of the cover plate and the substrate are in fluid-tight contact, the sample conduit 76 is fluid tight as well. As discussed above, the cover plate 70 can be formed from any suitable material for forming substrate 52. To ensure that the sample conduit is fluid-tight, pressure sealing techniques may be employed, e.g., by using external means to urge the pieces together (such as clips, tension springs or associated clamping apparatus). However, excessive pressure that precludes the substrate and cover plate contact surface from slidable contact should be avoided. The optimal pressure can be determined through routine experimentation.

Figure 3B:
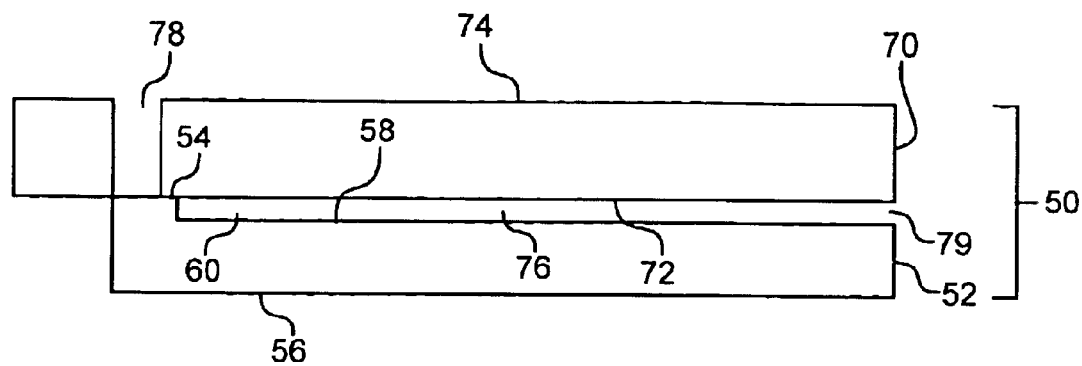
Figure 3C:
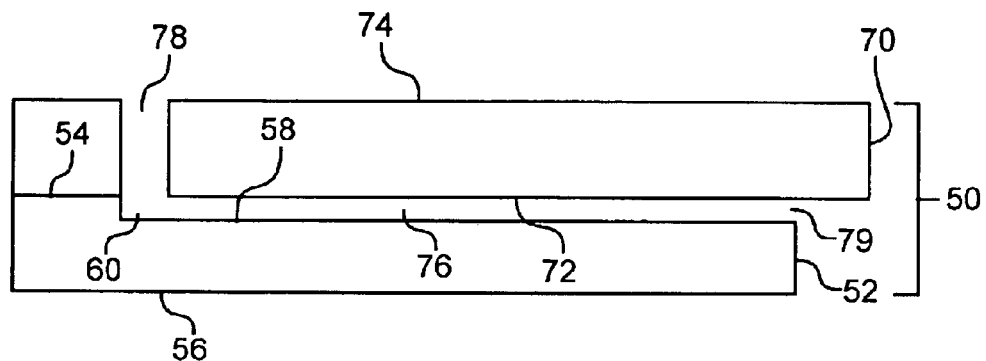

As shown, a sample inlet port 78 is provided as a conduit extending through the cover plate in a direction orthogonal to the cover plate contact surface 72 to provide communication between surfaces 72 and 74. The inlet port 78 can be arranged to communicate with the sample inlet terminus 60 of the sample microchannel 58. As shown, the inlet port 78 has a substantially constant cross-sectional area along its length. The sample inlet port 78 enables flow of the passage of fluid from an external source (not shown) into the sample microchannel. The cross sectional area of the inlet port should correspond to the width of the substrate microchannel and the shape of the microchannel at the inlet terminus. FIG. 3B, for example, illustrates in schematic cross-sectional view along the plane indicated by dotted line C the microdevice in a closed configuration. As shown, the sample inlet port is laterally offset from the inlet terminus of the substrate microchannel. Thus, the sample inlet port as shown is disengaged from the sample conduit 76. By linearly sliding the cover plate with respect to the substrate along the substrate trough to align the sample inlet port with the inlet terminus of the substrate microchannnel, as shown in FIG. 3C, fluid communication is provided therebetween resulting in the switching structure of the microdevice in an open configuration. That is, the sample inlet port 78 is provided fluid communication with the sample conduit 76. In operation, this sample fluid is introduced into sample inlet. When the microdevice is in an open configuration as shown in FIG. 3C, the sample fluid is conveyed, in order, through the sample inlet port 78, sample conduit 76, and sample outlet port 79.

It should be evident that the above-described embodiments differ from known valves in a number of different aspects. First, as these embodiments are intended for use in microdevices, fluid communication between the fluid-transporting features is achieved through a smaller area than previously known microdevices, typically an area no greater than about 1 mm$^2$. The small fluid communication area reduces the amount of dead space in the microdevice. Preferably, the fluid communication area is no greater than about 0.1 mm$^2$. Optimally, the fluid communication area is no greater than about 0.05 mm$^2$. With current technology, the lower limit for the fluid communication area is about 10$^{-6}$ mm$^2$, although it is likely that in the future, the lower limit may be reduced. In addition, because the inlet port comprises a conduit that defines a flow path having a substantially constant cross-sectional area, the dead volume associated with prior art valve structures as described above and illustrated in FIG. 1 is eliminated. The correspondence between the size and shape of the fluid-transporting features of the cover plate and the substrate further reduce the amount of dead space in the microdevice. As a result, no more than about 10% of the interior volume of typical inventive microdevice is dead space. Preferably, dead space does not exceed about 5% of the interior volume. Optimally, the dead space does not exceed about 1% of the interior volume. "Interior volume" is defined as the capacity of the microdevice to contain fluid therein. Parenthetically, it should be noted that while FIGS. 2 and 3 illustrate that the inventive microdevice may include a conduit as a cover plate fluid-transporting feature and a microchannel as a substrate fluid-transporting feature, this combination is not a necessity for the present invention. The inventive microdevice may include two channels or two conduits as well as other fluid conducting features or combinations thereof.

Another embodiment of the inventive microdevice involves a construction that provides greater versatility in fluid flow control. Generally, in this embodiment, at least one of the first or the second cover plate contact surfaces is positioned in slidable contact with a substrate contact surface to allow for controllable flow path formation. Such a microdevice is schematically illustrated in simplified form in FIG. 4. Rotational motion is employed to effect fluid flow switching between different fluid-transporting features. The microdevice 50 includes cylindrical substrate 52. The substrate 52 generally comprises first and second substantially planar opposing surfaces indicated at 54 and 56 respectively, and is comprised of a material that is substantially inert with respect to fluids that will be transported through the microdevice. The substrate 52 has two fluid-transporting features, one in the form of a cylindrical conduit 57 that provides fluid communication between the first and second substrate surfaces and the other in a form of a microchannel 58 in the first substrate contact surface 54. The microchannel extends along a diameter of the substrate and terminates at sample inlet and outlet termini, indicated at 60 and 62, respectively. Conduit 57 and each of termini 60 and 62 are located at the same distance from the center of the substrate. The fluid-transporting features may be formed through laser ablation of other techniques discussed below or known in the art.

Like the substrate, a first circular cover plate 70 is provided comprising first and second substantially planar opposing surfaces indicated at 72 and 74, respectively. The contact surface 72 of the first cover plate 70 is capable of interfacing closely with the first contact surface 54 of the substrate 52 to result in fluid-tight contact. The first cover plate 70 is arranged over the first substrate contact surface 74, and the first cover plate contact surface 72 in combination with the sample microchannel 58 defines a sample conduit 76 for conveying the sample. As the contact surfaces of the first cover plate and the substrate are in fluid-tight contact, the sample conduit 76 is also fluid tight. The first cover plate 70 can be formed from any suitable material for forming substrate 52 as described below. Further, the first cover plate 70 can be aligned over the substrate contact surface 54 by any of a number of alignment means described herein or known to the art. To ensure that the sample conduit is fluid-tight, pressure-sealing techniques may be employed, e.g., by using external means to urge the pieces together (such as clips, tension springs or associated clamping apparatus). Again, excessive pressure that precludes the substrate and the contact surface of the first cover plate from slidable contact should be avoided.

The first cover plate 70 may also include a number of fluid-transporting features. As illustrated in FIG. 4, sample inlet port 78 and first sample outlet port 79 are each provided as a cylindrical conduit extending through the first cover plate in a direction orthogonal to the first cover plate contact surface 72 to provide communication between surfaces 72 and 74. The inlet port 78 can be arranged to communicate with the sample inlet terminus 60 of the sample microchannel 58 while first outlet port 79 is simultaneously arranged to communicate with sample outlet terminus 62. As shown, both the inlet port 78 and the first outlet port 79 have a substantially constant cross-sectional area along their lengths.

A second circular cover plate 80 is provided comprising first and second substantially planar opposing surfaces indicated at 82 and 84, respectively. The contact surface 82 of the second cover plate 80 is capable of interfacing closely with the second contact surface 56 of the substrate 52 to result in fluid-tight contact. The second cover plate 80 may also include a number of fluid-transporting features. As illustrated in FIG. 4, a microchannel 86 is provided originating at inlet terminus 88 on contact surface 82 and terminates at a second sample outlet port 90. The second sample outlet port is provided as a cylindrical conduit extending through the second cover plate in a direction orthogonal to the cover plate contact surface 82 to provide communication between microchannel 86 and surface 84.

The substrate 50 is arranged over the second cover plate contact surface 82, and the second substrate contact surface 54 in combination with the sample microchannel 86 of the second cover plate 80 defines a sample conduit 92 for conveying a fluid. Because the second contact surface of the substrate and the contact surface of the second cover plate are in fluid-tight contact, the sample conduit 92 is fluid tight as well. The second cover plate 80 can be formed from any suitable material for forming substrate 52 as described below. Further, the cover plate 80 is typically aligned with respect to the second substrate contact surface 54 to ensure that the inlet terminus 88 of the second cover plate microchannel communicates with conduit 57 of the substrate.

Figure 4A:
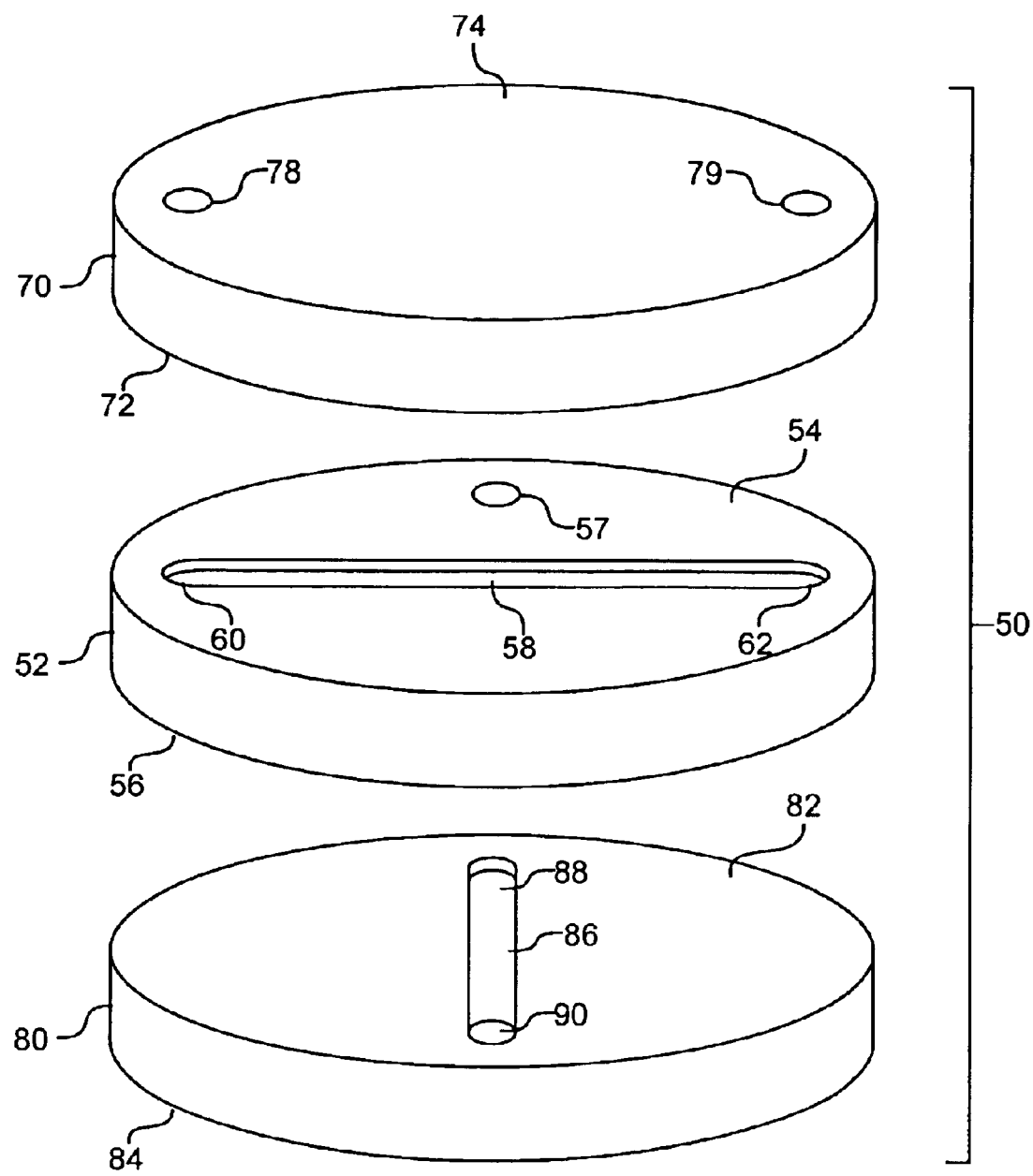
FIGS. 4A, 4B, 4C, 4D and 4E, collectively referred to as FIG. 4, schematically illustrate a microdevice having a valve structure that employs rotational motion to effect controllable flow path formation through switching between different fluid-transporting features.
Figure 4B:
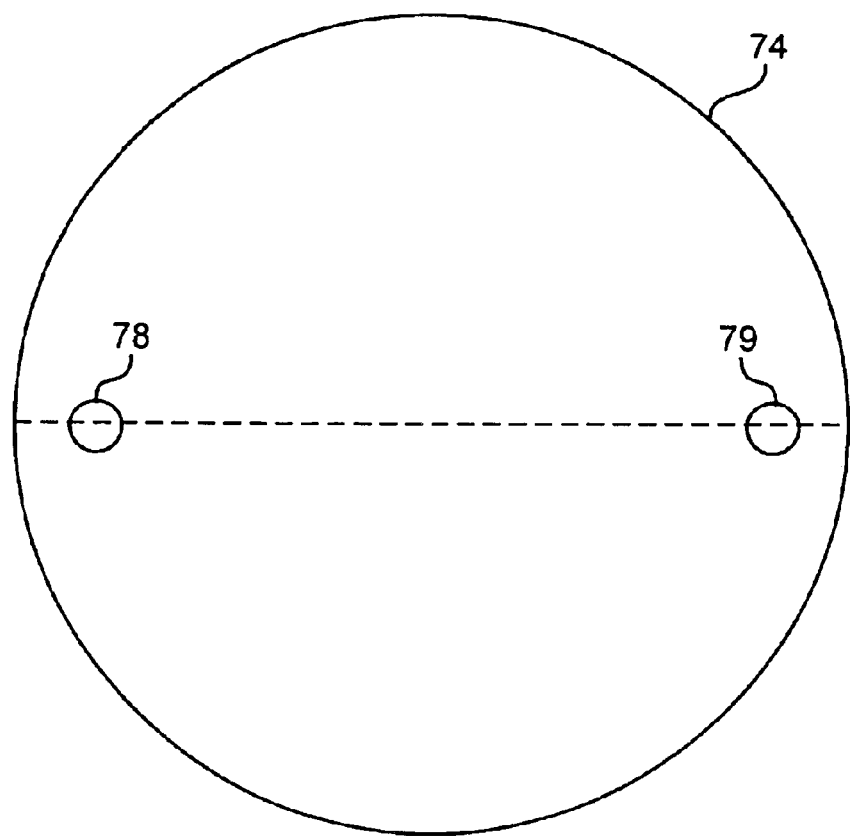
Figure 4C:
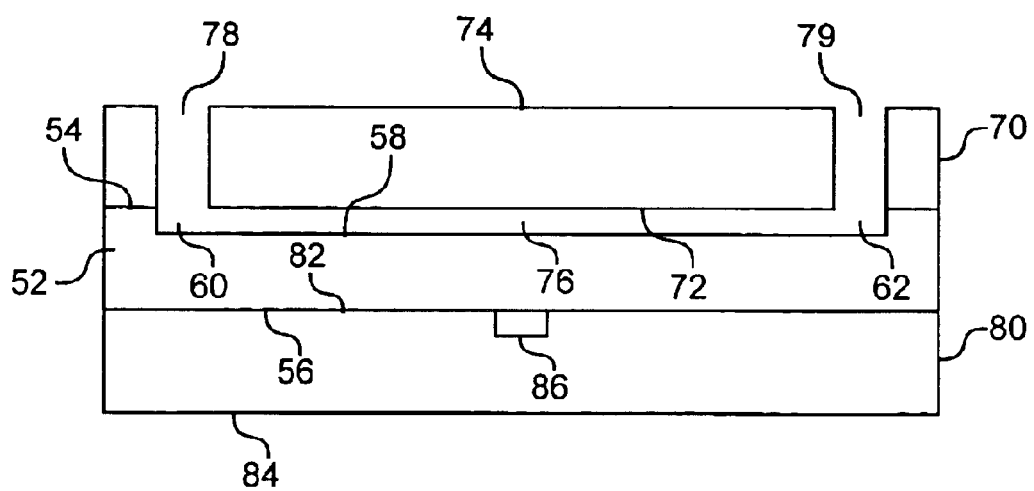
Figure 4D:
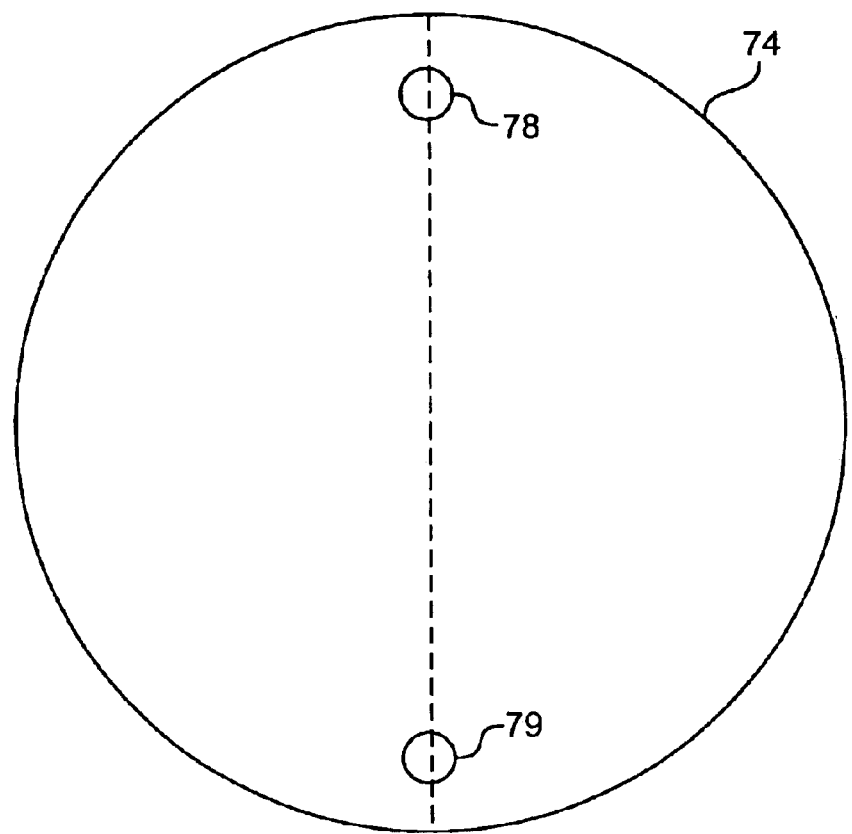
Figure 4E:
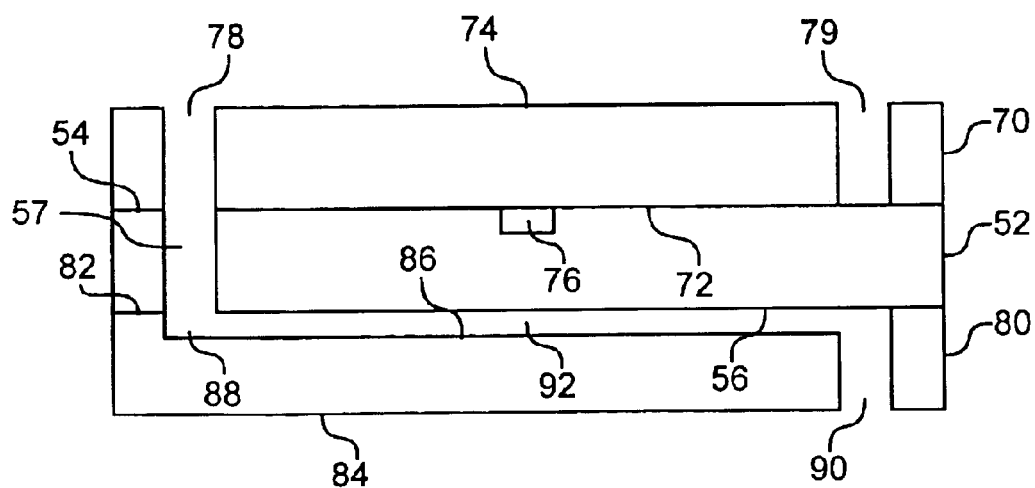

It should be evident that different flow paths may result due to the alignment of the first cover plate with respect to the substrate. FIG. 4 illustrates that one of two flow paths may be result depending on the rotational orientation of the first cover plate with respect to the substrate and the second cover plate. FIGS. 4B and 4C illustrate an example of the inventive microdevice in a first configuration to allow fluid to flow, in order, through inlet, substrate conduit and first cover plate outlet. FIG. 4B illustrates the example in top view and FIG. 4C illustrates the device of FIG. 4B in cross-sectional view along dotted line D. As shown in FIGS. 4D and 4E, by rotating the first cover plate with respect to the substrate, a different flow path is created to allow fluid to flow, in order, through inlet, second cover plate conduit and second cover plate outlet. FIG. 4D illustrates in top view the device having a rotated first cover plate and FIG. 4E illustrates the device of FIG. 4D in cross-sectional view along dotted line E.

In addition, a number of variations are possible with such a structure. For example, while FIG. 4 illustrates rotationally sliding motion is employed to switch flow paths, one of ordinary skill in the art will recognize that a microdevice may be constructed to employ linear sliding motion. In some instances, it may be advantageous to substantially immobilize the first and second cover plates with respect to each other. Alternatively, the substrate may be substantially immobilized with respect to either the first or second cover plate. Such variations depend on the desired function of the microdevice as well as the geometric considerations associated with the fluid-transporting features. As discussed above, fluid communication between the cover plate fluid-transporting feature is typically achieved through an area no greater than about 1 mm$^2$ to reduce the amount of dead space in the microdevice. In addition, the size and shape of the fluid conducting features of the cover plates and the substrate should be selected to further reduce the amount of dead space in the microdevice. Further, additional substrates and/or cover plates having associated features may be provided in stacked or other spatial relationship to provide additional control over fluid flow.

Another embodiment relates to a microdevice for controlling fluid flow comprising a substrate and a cover plate each having a substantially planar contact surface. A fluid-transporting feature is associated with each contact surface. The substrate contact surface is positioned in slidable and fluid-tight contact with the cover plate contact surface to allow for controllable alignment between the fluid-transporting features to form an alignment-dependent variable-length flow path.

Figure 5A:
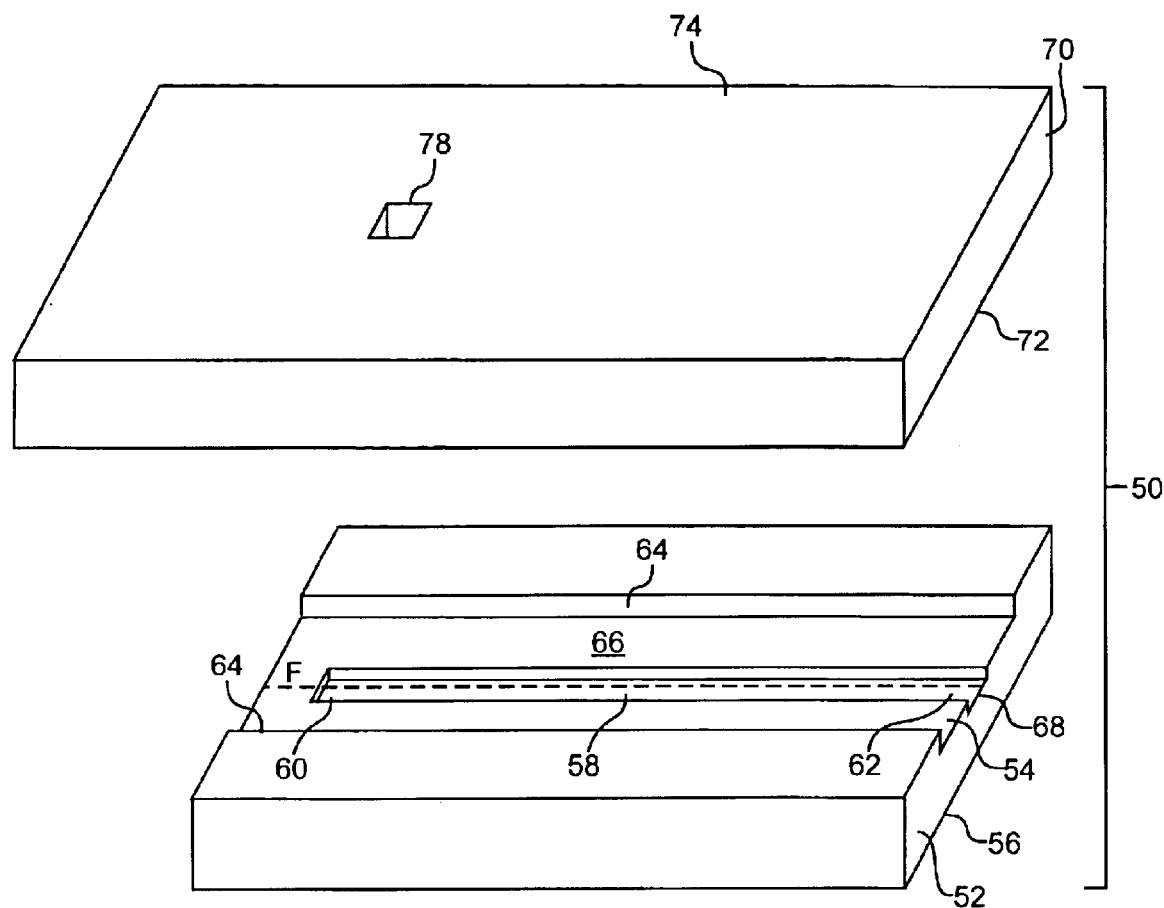
FIGS. 5A, 5B, and 5C, collectively referred to as FIG. 5, schematically illustrate a microdevice having a valve structure that provides for a variable-length flow path.

FIG. 5 schematically illustrates an example of this embodiment. This embodiment is similar to the embodiment illustrated in FIG. 3 in that linear sliding motion is employed to alter flow path length. As before, the microdevice 50 includes a substrate 52 having first and second substantially planar opposing surfaces indicated at 54 and 56 respectively. Again, the substrate is comprised of a material that is substantially inert with respect to fluids that will be transported through the microdevice. The substrate 52 has a fluid-transporting feature in the form of a sample microchannel 58 in the first planar surface 54. The sample microchannel 58 has a sample inlet terminus 60 at one end and a sample outlet terminus 62 at another end. Protruding from the contact surface are optional projections 64 that serve to assist in the proper alignment of the cover plate with the substrate. Together with the contact surface, the projections form a trough 66 having parallel, planar and vertical sidewalls. The sample inlet terminus 60 is at the center located of the trough 66. The sample microchannel extends along the length of the trough and terminates at sample outlet terminus located at an edge 68 of the substrate 52.

Like the substrate, a rectangular cover plate 70 is provided generally comprising first and second substantially planar opposing surfaces indicated at 72 and 74, respectively. As illustrated in FIG. 5, the width of the cover plate is the same as the width of the substrate trough but the length of the cover plate is longer than the length of the trough. The contact surface 72 of the cover plate 70 is capable of interfacing closely with the contact surface 54 of the substrate 52 to result in fluid-tight contact. As discussed above, the cover plate 70 can be formed from any suitable material for forming substrate 52. To ensure that the sample conduit is fluid-tight, pressure-sealing techniques may be employed, e.g., by using external means to urge the pieces together (such as clips, tension springs or associated clamping apparatus). However, excessive pressure that precludes the substrate and cover plate contact surface from slidably contacting each other should be avoided. The optimal pressure can be determined through routine experimentation.

As shown, a sample inlet port 78 is provided as a conduit extending through the cover plate in a direction orthogonal to the cover plate contact surface 72 to provide communication between surfaces 72 and 74. Extending from the cover plate contact surface adjacent to the sample inlet port is a stopper 94, shaped to fit in microchannel 58. The inlet port 78 can be arranged to communicate with the sample inlet terminus 60 of the sample microchannel 58. The sample inlet port 78 enables flow of the passage of fluid from an external source (not shown) into the sample microchannel. The size of the inlet port preferably corresponds to the width of the substrate microchannel.

Figure 5B:
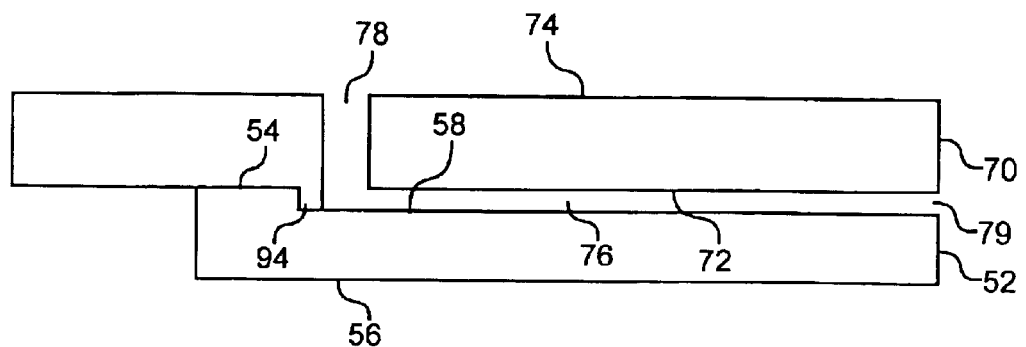
Figure 5C:
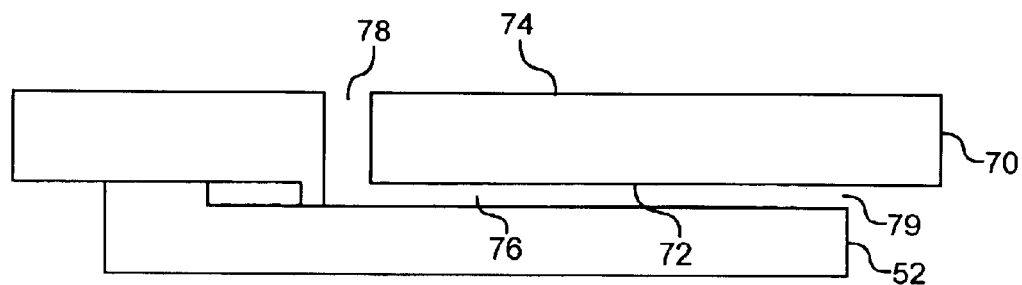

In operation, the cover plate 70 is placed within the trough and thus arranged over the substrate contact surface 74, the cover plate 70 aligned by the projections 64 that form the side walls of the trough. The cover plate contact surface 72 in combination with the sample microchannel 58 defines a sample conduit 76 for conveying the sample. Because the contact surfaces of the cover plate and the substrate are in fluid-tight contact, the sample conduit 76 is fluid tight as well. In addition, the stopper 94 also forms a fluid-tight contact with the interior surface of the microchannel 58. Thus, as illustrated in FIG. 5B, the inlet port 78 enables flow of the passage of fluid from an external source (not shown) into the sample microchannel. In addition, the stopper also serves to define the sample conduit 76. By linearly sliding the cover plate with respect to the substrate along the substrate trough, as shown in FIG. 5C, the fluid flow path is shortened. The variability of the flow path length is selected according to the desired function of the microdevice.

The materials used to form the substrates and cover plates in the microdevices of the invention as described above are selected with regard to physical and chemical characteristics that are desirable for proper functioning of the microdevice. In all cases, the substrate must be fabricated from a material that enables formation of high definition (or high "resolution") features, i.e., microchannels, chambers and the like, that are of micron or submicron dimensions. That is, the material must be capable of microfabrication using, e.g., dry etching, wet etching, laser etching, laser ablation, molding, embossing, or the like, so as to have desired miniaturized surface features; preferably, the substrate is capable of being microfabricated in such a manner as to form features in, on and/or through the surface of the substrate. Microstructures can also be formed on the surface of a substrate by adding material thereto, for example, polymer channels can be formed on the surface of a glass substrate using photoimageable polyimide. Also, all device materials used should be chemically inert and physically stable with respect to any substance with which they come into contact when used to introduce a fluid sample (e.g., with respect to pH, electric fields, etc.). Suitable materials for forming the present devices include, but are not limited to, polymeric materials, ceramics (including aluminum oxide and the like), glass, metals, composites, and laminates thereof.

Polymeric materials are particularly preferred herein, and will typically be organic polymers that are either homopolymers or copolymers, naturally occurring or synthetic, crosslinked or uncrosslinked. Specific polymers of interest include, but are not limited to, polyimides, polycarbonates, polyesters, polyamides, polyethers, polyurethanes, polyfluorocarbons, polystyrenes, poly(acrylonitrile-butadiene-styrene)(ABS), acrylate and acrylic acid polymers such as polymethyl methacrylate, and other substituted and unsubstituted polyolefins, and copolymers thereof. Generally, at least one of the substrate or cover plate comprises a biofouling-resistant polymer when the microdevice is employed to transport biological fluids. Polyimide is of particular interest and has proven to be a highly desirable substrate material in a number of contexts. Polyimides are commercially available, e.g., under the tradename Kapton®, (DuPont, Wilmington, Del.) and Upilex® (Ube Industries, Ltd., Japan). Polyetheretherketones (PEEK) also exhibit desirable biofouling resistant properties.

The devices of the invention may also be fabricated from a "composite," i.e., a composition comprised of unlike materials. The composite may be a block composite, e.g., an A-B-A block composite, an A-B-C block composite, or the like. Alternatively, the composite may be a heterogeneous combination of materials, i.e., in which the materials are distinct from separate phases, or a homogeneous combination of unlike materials. As used herein, the term "composite" is used to include a "laminate" composite. A "laminate" refers to a composite material formed from several different bonded layers of identical or different materials. Other preferred composite substrates include polymer laminates, polymer-metal laminates, e.g., polymer coated with copper, a ceramic-in-metal or a polymer-in-metal composite. One preferred composite material is a polyimide laminate formed from a first layer of polyimide such as Kapton®, that has been co-extruded with a second, thin layer of a thermal adhesive form of polyimide known as KJ®, also available from DuPont (Wilmington, Del.).

The present microdevices can be fabricated using any convenient method, including, but not limited to, micromolding and casting techniques, embossing methods, surface micro-machining and bulk-micromachining. The latter technique involves formation of microstructures by etching directly into a bulk material, typically using wet chemical etching or reactive ion etching ("RIE"). Surface micromachining involves fabrication from films deposited on the surface of a substrate. An exemplary surface micromachining process is known as "LIGA." See, for example, Becker et al. (1986), "Fabrication of Microstructures with High Aspect Ratios and Great Structural Heights by Synchrotron Radiation Lithography Galvanoforming, and Plastic Moulding (LIGA Process)," *Microelectronic Engineering* 4(1):35–36; Ehrfeld et al. (1988), "1988 LIGA Process: Sensor Construction Techniques via X-Ray Lithography," *Tech. Digest from IEEE Solid-State Sensor and Actuator Workshop*, Hilton Head, S.C.; Guckel et al. (1991) *J. Micromech. Microeng.* 1: 135–138. LIGA involves deposition of a relatively thick layer of an X-ray resist on a substrate followed by exposure to high-energy X-ray radiation through an X-ray mask, and removal of the irradiated resist portions using a chemical developer. The LIGA mold so provided can be used to prepare structures having horizontal dimensions—i.e., diameters—on the order of microns.

A preferred technique for preparing the present microdevices is laser ablation. In laser ablation, short pulses of intense ultraviolet light are absorbed in a thin surface layer of material. Preferred pulse energies are greater than about 100 millijoules per square centimeter and pulse durations are shorter than about 1 microsecond. Under these conditions, the intense ultraviolet light photo-dissociates the chemical bonds in the substrate surface. The absorbed ultraviolet energy is concentrated in such a small volume of material that it rapidly heats the dissociated fragments and ejects them away from the substrate surface. Because these processes occur so quickly, there is no time for heat to propagate to the surrounding material. As a result, the surrounding region is not melted or otherwise damaged, and the perimeter of ablated features can replicate the shape of the incident optical beam with precision on the scale of about one micron or less. Laser ablation will typically involve use of a high-energy photon laser such as an excimer laser of the $F_2$, ArF, KrCl, KrF, or XeCl type or of solid Nd-YAG or Ti:sapphire types. However, other ultraviolet light sources with substantially the same optical wavelengths and energy densities may be used as well. Laser ablation techniques are described, for example, by Znotins et al. (1987) *Laser Focus Electro Optics*, at pp. 54–70, and in U.S. Pat. Nos. 5,291,226 and 5,305,015 to Schantz et al.

The fabrication technique that is used must provide for features of sufficiently high definition, i.e., microscale components, channels, chambers, etc., such that precise alignment "microalignment" of these features is possible, i.e., the laser-ablated features are precisely and accurately aligned, including, e.g., the alignment of complementary microchannels with each other, projections and mating depressions, grooves and mating ridges, and the like.

From the above description of the various embodiments of the invention, it is evident that the inventive valve structure provides a number of advantages over the devices of the prior art. The invention provides greater control over fluid transport in microdevices by reducing dead space. It should also be evident that the valve structure may provide microdevices greater control in carrying out chemical or biochemical reactions and processes for sample preparation and analysis. For example, the invention may be employed with a detector that represents a component of a mass spectrometer or that is adapted to detect fluorescence. In addition, the invention is particularly useful for use with a separation unit. The separation unit may be an integral part of the microdevice or detachable from the microdevice. For example, the separation unit may be constructed to carry out chromatography.

Thus, variations of the present invention will be apparent to those of ordinary skill in the art. For example, additional substrates, cover plates and/or features may be included in stacked or other spatial arrangements to carry out such reactions and processes. Such features may be formed from conduits and channels that provide for fluid flow in parallel or a nonparallel direction with respect to the contact surfaces. In addition, the inventive valve structure may provide fluid communication to features on the same substrate or different substrates that would otherwise be isolated. In some instances, valve structures may be provided on opposing surfaces of microdevice. In other instances, rotationally slidable valve structures may be formed as concentric bodies. Moreover, additional substrates of a variety of shapes may be employed. Locking mechanisms may be provided to obtain a greater degree of control over the position of the contact surfaces. Particularly when the substrate and/or cover plate is formed from a hard material such as glass or silicon, a compliant sealing material or grease may be placed between the substrate and the cover plate.

It is to be understood that while the invention has been described in conjunction with the preferred specific embodiments thereof, the foregoing description is intended to illustrate and not limit the scope of the invention. Other aspects, advantages and modifications within the scope of the invention will be apparent to those skilled in the art to which the invention pertains.

All patents, patent applications, and publications mentioned herein are hereby incorporated by reference in their entireties.

We claim:

1. A microdevice for controlling fluid flow, comprising:
   a cover plate having a substantially planar contact surface and a plurality of fluid-transporting features associated therewith; and
   a substrate having a substantially planar contact surface and a fluid-transporting feature associated therewith,
   wherein the contact surfaces are positioned in slidable and fluid-tight contact to allow for controllable formation of a plurality of different flow paths upon alignment of the substrate fluid-transporting feature with each cover plate fluid-transporting feature in succession.

2. The microdevice of claim 1, wherein the cover plate is arranged over the substrate.

3. The microdevice of claim 1, wherein the substrate is arranged over the cover plate.

4. The microdevice of claim 1, wherein at least one cover plate fluid-transporting feature comprises a conduit having a substantially constant cross-sectional area.

5. The microdevice of claim 1, wherein the substrate fluid-transporting feature comprises a conduit having a substantially constant cross-sectional area.

6. The microdevice of claim 1, wherein the substrate fluid-transporting feature and at least one cover plate fluid-transporting feature, upon alignment, form a fluid-transporting conduit having a controllable cross-sectional area no greater than about 1 $mm^2$.

7. The microdevice of claim 6, wherein the area is no greater than about 0.1 $mm^2$.

8. The microdevice of claim 1, wherein the contact surfaces are rotationally slidable with respect to each other.

9. The microdevice of claim 1, wherein the contact surfaces are linearly slidable with respect to each other.

10. The microdevice of claim 1, wherein at least one fluid-transporting feature comprises a channel.

11. The microdevice of claim 1, wherein at least fluid-transporting feature is in fluid communication with a separation unit.

12. The microdevice of claim 11, wherein the separation unit is an integral part of the microdevice.

13. The microdevice of claim 11, wherein the separation unit is detachable from the microdevice.

14. The microdevice of claim 1, wherein the separation unit is constructed to carry out chromatography.

15. The microdevice of claim 1, wherein at least fluid-transporting feature is in fluid communication with a mass spectrometer.

16. The microdevice of claim 1, wherein the substrate, cover plate, or both comprise a biofouling-resistant polymer.

17. The microdevice of claim 16, wherein the biofouling-resistant polymer is selected from the group consisting of polyimides, polyketone, mixtures thereof, and copolymers thereof.

18. The microdevice of claim 1, wherein each flow path has a different length.

19. A microdevice for controlling fluid flow, comprising:
   a cover plate having a substantially planar contact surface and a plurality of fluid-transporting features associated therewith; and
   a substrate having a substantially planar contact surface and a fluid-transporting feature associated therewith,
   wherein the substrate is comprised of a biofouling resistant polymer, and the contact surfaces are positioned in slidable and fluid-tight contact to allow for controllable formation of a plurality of different flow paths upon alignment of the substrate fluid-transporting feature with each cover plate fluid-transporting feature in succession.

20. A microdevice for controlling fluid flow, comprising:

a cover plate having a substantially planar contact surface and a plurality of fluid-transporting features associated therewith; and a substrate having a substantially planar contact surface and a plurality of fluid-transporting feature associated therewith, wherein the contact surfaces are positioned in slidable and fluid-tight contact to allow for controllable formation of different flow paths in the microdevice, and further wherein each flow path has a cross-sectional area no greater than about 1 mm$^2$ and is formed as a result of a different alignment of the fluid-transporting features.

* * * * *